(12) United States Patent
Shionoya et al.

(10) Patent No.: US 11,670,117 B2
(45) Date of Patent: Jun. 6, 2023

(54) VEHICLE AND SOFTWARE UPDATE METHOD

(71) Applicant: HONDA MOTOR CO., LTD., Tokyo (JP)

(72) Inventors: Yosuke Shionoya, Wako (JP); Tomoaki Taki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 17/132,267

(22) Filed: Dec. 23, 2020

(65) Prior Publication Data

US 2021/0201599 A1 Jul. 1, 2021

(30) Foreign Application Priority Data

Dec. 27, 2019 (JP) .............................. JP2019-237835

(51) Int. Cl.
| | | |
|---|---|---|
| G07C 5/00 | (2006.01) | |
| G07C 5/08 | (2006.01) | |
| B60W 20/20 | (2016.01) | |
| B60W 30/192 | (2012.01) | |
| B60W 20/15 | (2016.01) | |

(52) U.S. Cl.
CPC ............. *G07C 5/008* (2013.01); *B60W 20/15* (2016.01); *B60W 20/20* (2013.01); *B60W 30/192* (2013.01); *G07C 5/0841* (2013.01); *B60W 2510/085* (2013.01)

(58) Field of Classification Search
None
See application file for complete search history.

(56) References Cited

U.S. PATENT DOCUMENTS

| | | | |
|---|---|---|---|
| 11,164,398 B2 | 11/2021 | Teraoka | |
| 2012/0185124 A1* | 7/2012 | Leisenring | G07C 5/008 701/1 |
| 2015/0331686 A1* | 11/2015 | Petersen | G06F 8/65 701/31.5 |
| 2017/0061708 A1* | 3/2017 | Sol | G06F 8/65 |
| 2018/0018160 A1* | 1/2018 | Teraoka | G06F 8/65 |
| 2018/0152341 A1 | 5/2018 | Maeda et al. | |
| 2019/0168737 A1* | 6/2019 | Takahashi | B60L 50/15 |
| 2019/0312892 A1* | 10/2019 | Chung | G06F 21/554 |

FOREIGN PATENT DOCUMENTS

| | | |
|---|---|---|
| JP | 2001-075786 A | 3/2001 |
| JP | 2011-148398 A | 8/2011 |
| JP | 2019-191619 A | 10/2019 |
| WO | 2017/046981 A1 | 3/2017 |

\* cited by examiner

*Primary Examiner* — Todd Melton
*Assistant Examiner* — Jason R Roberson
(74) *Attorney, Agent, or Firm* — Carrier Shende & Associates, P.C.; Joseph P. Carrier; Jeffrey T. Gedeon

(57) ABSTRACT

An OTA manager, when an activation switch of a vehicle is OFF, transmits a unique identifier of each electronic control unit acquired before the activation switch was switched from ON to OFF to an OTA server via a communication line and receives update data from the OTA server via the communication line, and after the activation switch was switched from OFF to ON, the OTA manager makes a comparison between the identifiers transmitted to the OTA server before the activation switch was switched from OFF to ON and the identifiers acquired after the activation switch was switched from OFF to ON.

9 Claims, 15 Drawing Sheets

VEHICLE AND SOFTWARE UPDATE METHOD

CROSS-REFERENCE TO RELATED APPLICATION

This application is based upon and claims the benefit of priority from Japanese Patent Application No. 2019-237835 filed on Dec. 27, 2019, the contents of which are incorporated herein by reference.

BACKGROUND OF THE INVENTION

Field of the Invention

The present invention relates to a vehicle that includes a plurality of electronic control units and updates the software of each electronic control unit using update data transmitted from a server through a communication line, and to a software update method for updating the software of each electronic control unit using the update data transmitted from the server via the communication line, in the vehicle that includes the plurality of electronic control units.

Description of the Related Art

Japanese Laid-Open Patent Publication No. 2001-075786 discloses a program file download system, in which a server and a terminal are connected via a network and the terminal downloads program files transmitted from the server.

SUMMARY OF THE INVENTION

However, with the technology disclosed in Japanese Laid-Open Patent Publication No. 2001-075786, there is no consideration made to the download of the update data for updating the software of the electronic control units of the vehicle, and there is a desire for technology making it possible to more favorably perform the download of the update data for updating the software of the electronic control units of the vehicles.

The present invention has been devised taking into consideration the aforementioned problem, and has the object of providing a vehicle and a software update method making it possible to more favorably perform the download of update data for updating software of electronic units of the vehicle.

A first aspect of the present invention is a vehicle, which includes a plurality of electronic control units and updates software of each electronic control unit with update data transmitted from a server via a communication line, including an update managing section that, when an activation switch of the vehicle is OFF, transmits a unique identifier of each electronic control unit acquired before the activation switch was switched from ON to OFF to the server via the communication line and receives the update data corresponding to the transmitted identifiers from the server via the communication line, wherein, after the activation switch has been switched from OFF to ON, the update managing section makes a comparison between the identifiers transmitted to the server before the activation switch was switched from OFF to ON and the identifiers acquired after the activation switch was switched from OFF to ON.

A second aspect of the present invention is a software update method for, in a vehicle that includes a plurality of electronic control units, updating software of each electronic control unit with update data transmitted from a server via a communication line, including: when an activation switch of the vehicle is OFF, transmitting a unique identifier of each electronic control unit acquired before the activation switch was switched from ON to OFF to the server via the communication line and receiving the update data corresponding to the transmitted identifiers from the server via the communication line; and after the activation switch has been switched from OFF to ON, making a comparison between the identifiers transmitted to the server before the activation switch was switched from OFF to ON and the identifiers acquired after the activation switch was switched from OFF to ON.

According to the present invention, it is possible to more favorably perform the download of update data for updating the software of electronic control units of a vehicle.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

First Embodiment

[Configuration of the Software Update System]

Figure 1:
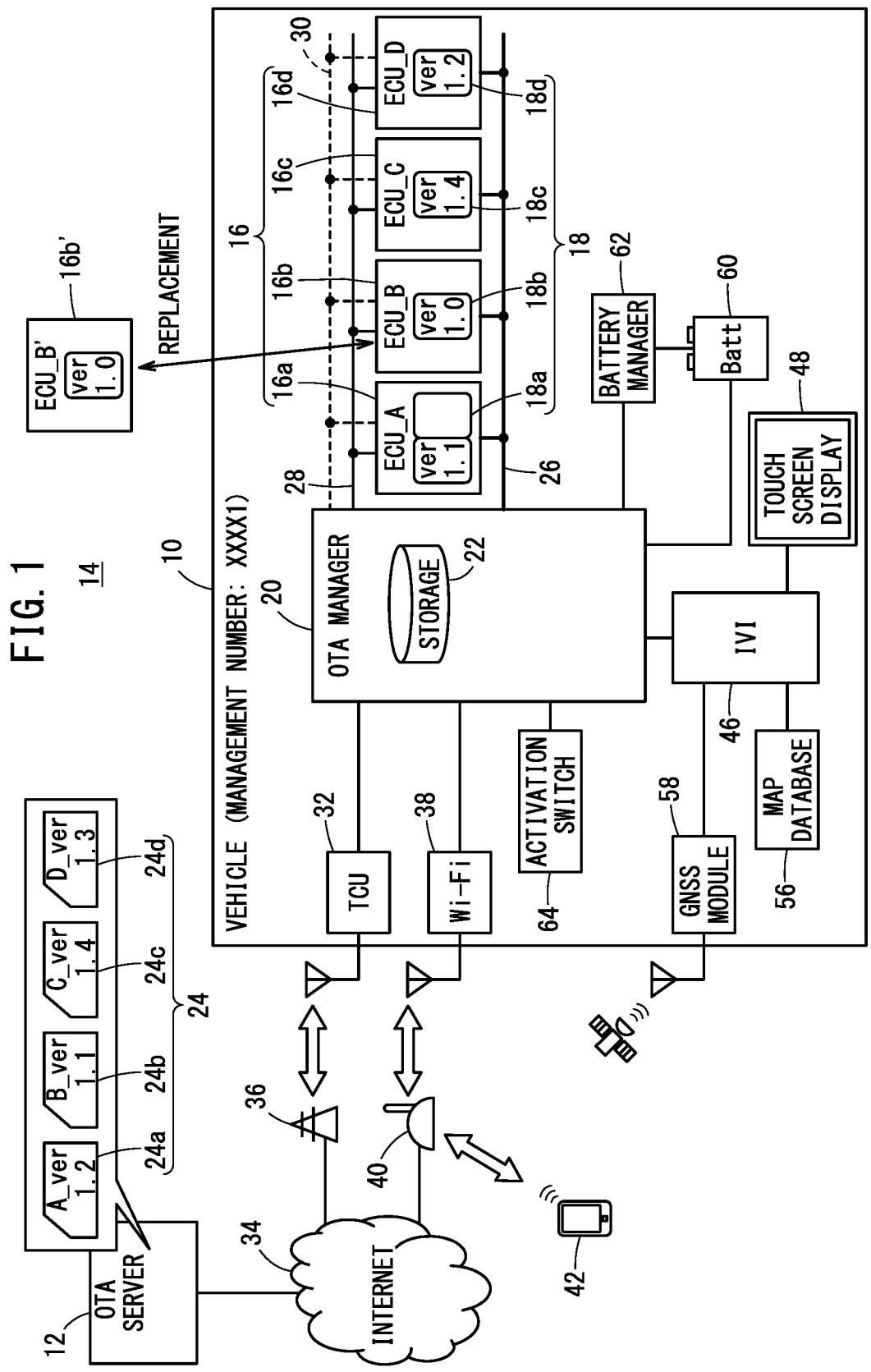
FIG. 1 is a schematic view of a software update system made up of a vehicle and an OTA server.

FIG. 1 is a schematic view of a software update system 14 made up of a vehicle 10 and an OTA server 12.

A large number of electronic control units (referred to as ECUs below) 16 are loaded in the vehicle 10. Each ECU 16 performs control to realize travelling functions of the vehicle 10 and other functions. As shown in FIG. 1, the following is a description using an example in which four ECUs 16, which are an ECU_A 16a, an ECU_B 16b, an ECU_C 16c, and an ECU_D 16d, are loaded in the vehicle 10. When not specifically distinguishing between the ECU_A 16a, the ECU_B 16b, the ECU_C 16c, and the ECU_D 16d, these components are referred to as ECUs 16. The ECUs 16 include a processor such as a central processing unit (CPU) or micro-processing unit (MPU), a non-transitory tangible computer-readable storage medium such as a RAM, a communication module for communicating with other apparatuses via a CAN (Registered Trademark), and the like (not shown in the drawings).

The ECU_A 16a includes a ROM 18a, the ECU_B 16b includes a ROM 18b, the ECU_C 16c includes a ROM 18c, and the ECU_D 16d includes a ROM 18d. When not specifically distinguishing between the ROM 18a, the ROM 18b, the ROM 18c, and the ROM 18d, these components are referred to as ROMs 18. The ROMs 18 store software programs, setting files, data, and various libraries to be executed by the ECUs 16 (referred to below as programs and the like).

The ROM 18a is a so-called two-sided ROM, which includes two data storage regions. Software programs and the like that are currently being used are stored in one storage region of the ROM 18a. The other storage region of the ROM 18a is empty, or stores software programs or the like that are not currently being used. The ROM 18b, the ROM 18c, and the ROM 18d are so-called one-sided ROMs, each of which includes one data storage region. Software programs and the like that are currently being used are stored in the storage regions of the ROM 18b, the ROM 18c, and the ROM 18d, and there is no empty storage space in the ROM 18b, the ROM 18c, and the ROM 18d.

The vehicle 10 includes an OTA manager 20. In the same manner as the ECUs 16, the OTA manager 20 includes a processor such as a central processing unit (CPU) or microprocessing unit (MPU), a non-transitory tangible computer-readable storage medium such as a ROM or RAM, a communication module for communicating with other apparatuses via a CAN, and the like (not shown in the drawings). Furthermore, the OTA manager 20 includes a storage 22. The OTA manager 20 corresponds to an update managing section of the present invention.

The OTA manager 20 manages the update of the software of the ECUs 16. The software update is made up of software download, software installation, and software activation.

The software download refers to the OTA manager 20 receiving update data 24 transmitted from the OTA server 12 via a communication line and saving this update data 24 in the storage 22 of the OTA manager 20. The update data 24 is data including software programs and the like. The update data 24 may include an installer.

The software installation refers to expanding the downloaded update data 24 in the ROMs 18 of the ECUs 16 and setting the software to a state that can be executed by the ECUs 16. The software installation may be performed by the installer. The software installation may be performed by copying the update data 24 to the ROMs 18.

The software activation refers to a verification process of a license of the installed software. When the software activation is completed, the execution of the software by the ECUs 16 is permitted. The activation may be performed by the OTA manager 20, or may be performed by each ECU 16. In the present embodiment, the OTA manager 20 performs the activation.

The OTA manager 20 downloads the update data 24 transmitted from the OTA server 12. The OTA manager 20 expands the downloaded update data 24 in the ROMs 18, and installs the software in the ECUs 16. The OTA manager 20 activates the software installed in the ECUs 16.

In the following description, when no particular distinction is being made between the software download, installation, and activation, this may be referred to as a software update.

The OTA manager 20 and the ECUs 16 are connected with redundancy by a high-speed communication line 26, a low-speed communication line 28, and a backup communication line 30. The high-speed communication line 26, the low-speed communication line 28, and the backup communication line 30 are each capable of communication according to a protocol specified in a CAN. The communication speed of the high-speed communication line 26 is highest, followed in order by the communication speed of the low-speed communication line 28 and the communication speed of the backup communication line 30. The backup communication line 30 is a communication line for outputting the results of a self-diagnostic function, referred to as an on-board diagnosis (OBD) of each ECU 16, to the outside. The backup communication line 30 is used mainly used when performing a failure diagnosis, and is not usually used when a failure diagnosis is not being performed.

The communication lines connecting the OTA manager 20 and each ECU 16 are not limited to a CAN, and Ethernet (Registered Trademark) or a combination of both a CAN and Ethernet may be used. Furthermore, communication lines conforming to standards other than CAN and Ethernet may be used as these communication lines.

The OTA manager 20 is capable of communicating with a base station 36 that is connected to the Internet 34 using cellular communication, via a telematics control unit (TCU) 32. The communication fees for the cellular communication are born by the maker of the vehicle 10, and the user does not incur any monetary burden. The OTA manager 20 is capable of communicating with an access point 40 connected to the Internet 34 using wireless LAN communication, via a Wi-Fi module 38. Furthermore, the OTA manager 20 is capable of communicating with a terminal 42 connected to the same access point 40, via the Wi-Fi module 38. The terminal 42 is a device that is carried daily by the user, and is a tablet terminal such as a smartphone, for example. The cellular communication, the wireless LAN communication, and the Internet correspond to communication lines of the present invention.

An in-vehicle infotainment (IVI) system 46 is connected to the OTA manager 20. The IVI system 46 is a type of ECU 16 and, in the same manner as the other ECUs 16, includes a processor such as a central processing unit (CPU) or micro-processing unit (MPU), a non-transitory tangible computer-readable storage medium such as a RAM or ROM, a communication module for communicating with other apparatuses via a CAN, and the like (not shown in the drawings). The IVI system 46 provides information such as a display of route guidance or traffic information, and also provides entertainment using audio, DVDs, a television tuner, or the like.

Figure 2:
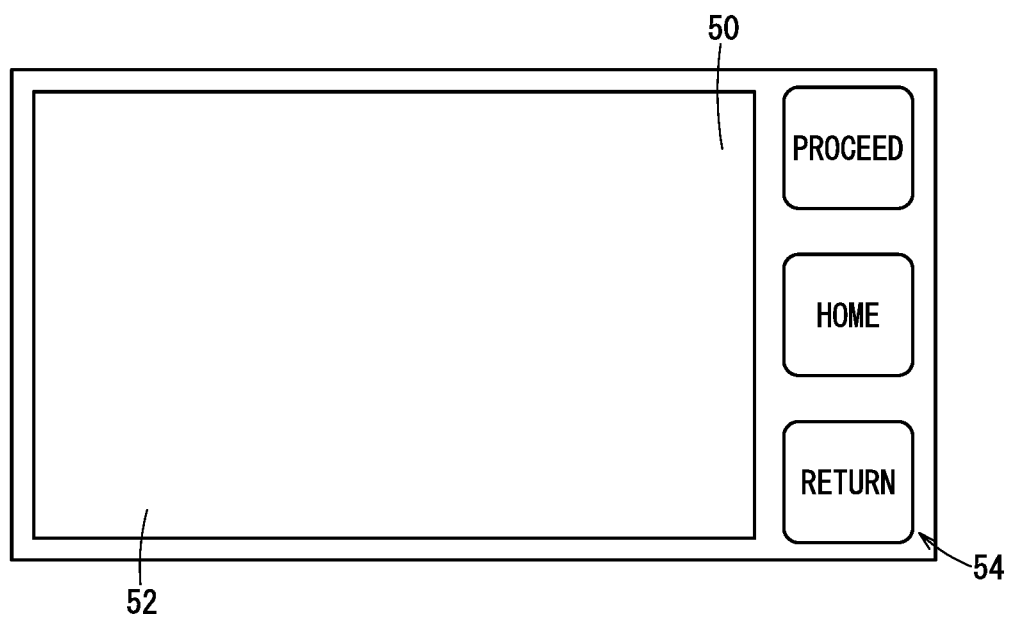
FIG. 2 shows a touch screen display.

A touch screen display 48 is connected to the IVI system 46. FIG. 2 shows the touch screen display 48. The touch screen display 48 is installed on a dashboard or the like of the vehicle 10. The touch screen display 48 includes a screen 50 for displaying images or the like. The screen 50 is liquid crystal, organic electroluminescence (organic EL), or the like, but is not particularly limited. A touch panel 52 is affixed to the surface of the screen 50. The touch panel 52 is a resistive film type, a capacitance type, or the like, but is not particularly limited. The touch screen display 48 receives a manipulation corresponding to a combination of a position where the touch panel 52 is touched by the user and the display that is displayed in the screen 50 at this time. A physical button 54 for switching the display in the screen 50 is provided next to the screen 50. The screen 50 of the touch screen display 48 corresponds to a notifying section of the present invention. Instead of the touch screen display 48, a combination of a display apparatus such as a heads-up display and a pointing device such as motion capture may be used.

Returning to FIG. 1, a map database 56 and a global navigation satellite system (referred to as GNSS below) module 58 are connected to the IVI system 46. The IVI system 46 provides map information from the map database 56, position information from the GNSS module 58, and route guidance.

The OTA manager 20 and each ECU 16 are driven by power supplied from a battery 60. The battery 60 is a lead-acid battery, for example, whose SOC is managed by a battery manager 62. The battery 60 is managed to be repeatedly charged and discharged such that the SOC is within a prescribed range (e.g., 90% to 100%). The battery manager 62 corresponds to a battery managing section of the present invention.

The vehicle 10 includes an activation switch 64. The activation switch 64 is a switch for activating the vehicle 10. If the vehicle 10 is an automobile with an engine, the activation switch 64 corresponds to an ignition switch. If the vehicle 10 is a hybrid automobile or an electric automobile, the activation switch 64 corresponds to a power switch. The vehicle 10 according to the present embodiment is an automobile with an engine, a hybrid automobile, an electric automobile, or the like, but is not particularly limited.

The OTA server 12 includes a processor such as a CPU, a non-transitory tangible computer-readable storage medium such as a ROM or RAM, a high-capacity storage apparatus such as a hard disk or SSD, a communication module connectable to the Internet via a LAN, and the like (not shown in the drawings). A large number of vehicles 10 are registered in the OTA server 12, and the OTA server 12 manages the update conditions of the software of the ECU of each vehicle 10, based on unique management numbers given to each vehicle 10. The OTA server 12 provides each vehicle 10 with the update data 24 for updating the software of the ECUs 16 of this vehicle 10.

Examples Used for Description

The following describes a software update in each ECU 16, and the example shown below is used when describing the present embodiment.

Version 1.1 software is installed in the ECU_A 16a. Version 1.0 software is installed in the ECU_B 16b. Version 1.4 software is installed in the ECU_C 16c. Version 1.2 software is installed in the ECU_D 16d.

Four sets of update data, which are update data 24a, update data 24b, update data 24c, and update data 24d, are registered in the OTA server 12. The update data 24a updates the software of the ECU_A 16a to version 1.2. The update data 24b updates the software of the ECU_B 16b to version 1.1. The update data 24c updates the software of the ECU_C 16c to version 1.4. The update data 24d updates the software of the ECU_D 16d to version 1.3.

[Software Update Flow for Normal Download]

Figure 3:
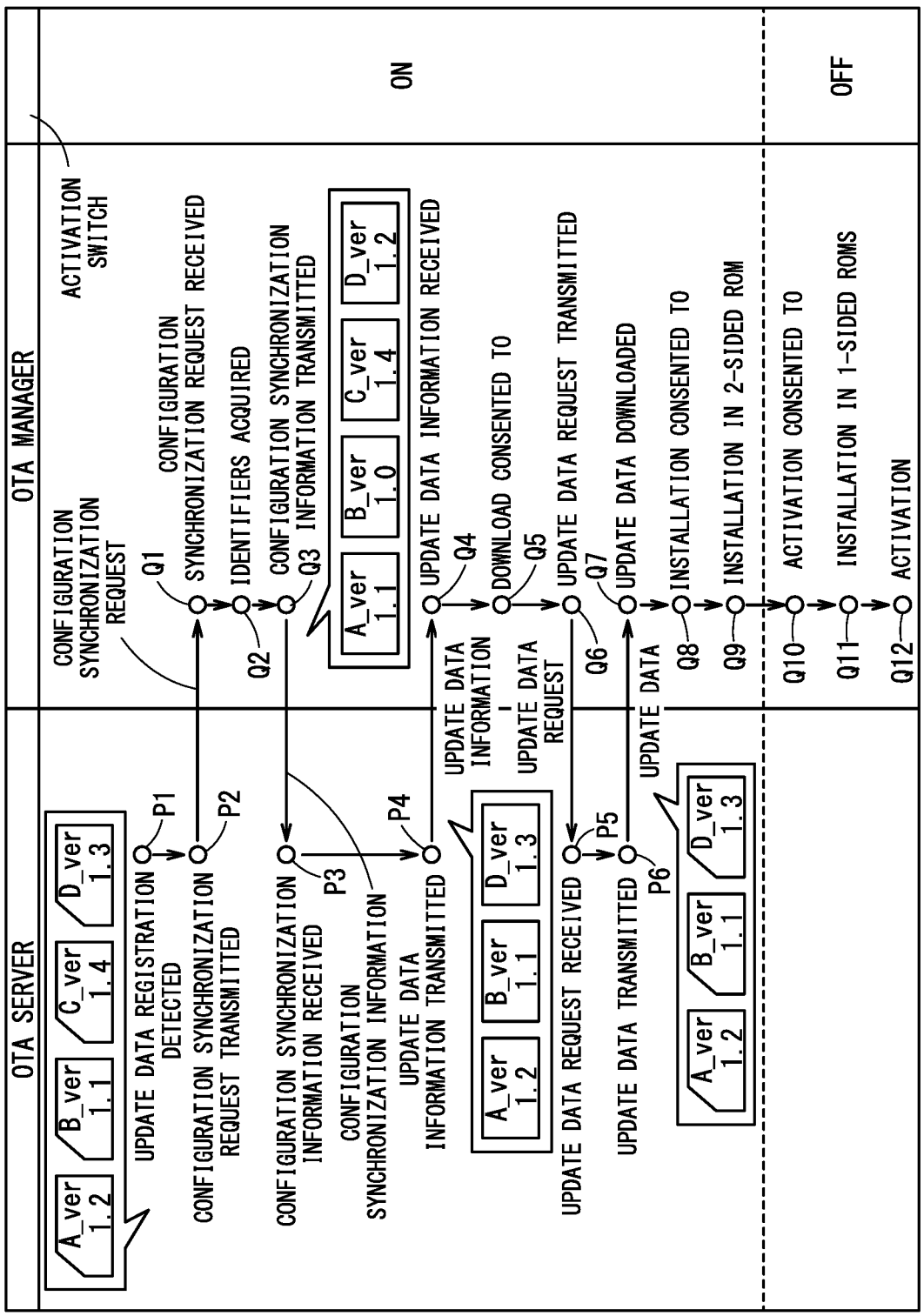
FIG. 3 is a flow diagram showing a software update flow for a normal download.

FIG. 3 is a flow chart showing the software update flow in the case of a normal download. A normal download refers to downloading the update data 24 when the activation switch 64 is ON.

When the OTA server 12 detects the registration of the update data 24 (P1), the OTA server 12 transmits a configuration synchronization request to the OTA manager 20 (P2).

The OTA manager 20 receives the configuration synchronization request when the activation switch 64 is ON (Q1) and acquires an identifier of each ECU 16 (Q2). The identifier of an ECU 16 is a unique symbol sequence given to the ECU 16. In this description, the identifier of the ECU_A 16a is A, the identifier of the ECU_B 16b is B, the identifier of the ECU_C 16c is C, and the identifier of the ECU_D 16d is D. The OTA manager 20 then transmits configuration synchronization information to the OTA server 12 (Q3). The configuration synchronization information is information that is a combination of the identifier of each ECU 16 of the vehicle 10 and the software version of each ECU 16. For example, the configuration synchronization information A_ver1.1 is generated by combining the identifier A of the ECU_A 16a and the software version 1.1 of the ECU_A 16a.

Upon receiving the configuration synchronization information (P3), the OTA server 12 selects the update data 24a, the update data 24b, and the update data 24d as the software update data 24 to be transmitted to the OTA manager 20 that transmitted the configuration synchronization information. The OTA server 12 then transmits the update data information of the selected update data 24a, update data 24b, and update data 24d to the OTA manager 20 (P4). The update data information includes information such as the name and version of the software to be updated by the update data 24, the size of the update data 24, and the like.

The update data 24c updates the software of the ECU_C 16c to version 1.4. However, since the software of the ECU_C 16c is already version 1.4, the update data 24c is not selected as software update data 24 to be transmitted.

The OTA manager 20 receives the update data (Q4). When the download is consented to by the user (Q5), the OTA manager 20 transmits the update data request to the OTA server 12 (Q6).

Upon receiving the update data request (P5), the OTA server 12 transmits the selected update data 24a, update data 24b, and update data 24d (P6).

The OTA manager 20 downloads the update data 24a, the update data 24b, and the update data 24d (Q7). When the installation is consented to by the user (Q8), the OTA manager 20 installs the software in the ECU_A 16a of the two-sided ROM (Q9).

When the activation switch 64 is switched from ON to OFF and the activation is consented to by the user (Q10), the OTA manager 20 installs the software in the ECU_B 16b and the ECU_D 16d of the one-sided ROMs (Q11). After this, the OTA manager 20 activates the software that has been installed in the ECU_A 16a, the ECU_B 16b, and the ECU_D 16d (Q12).

[Software Update Flow for Night-Time Download]

Figure 4:
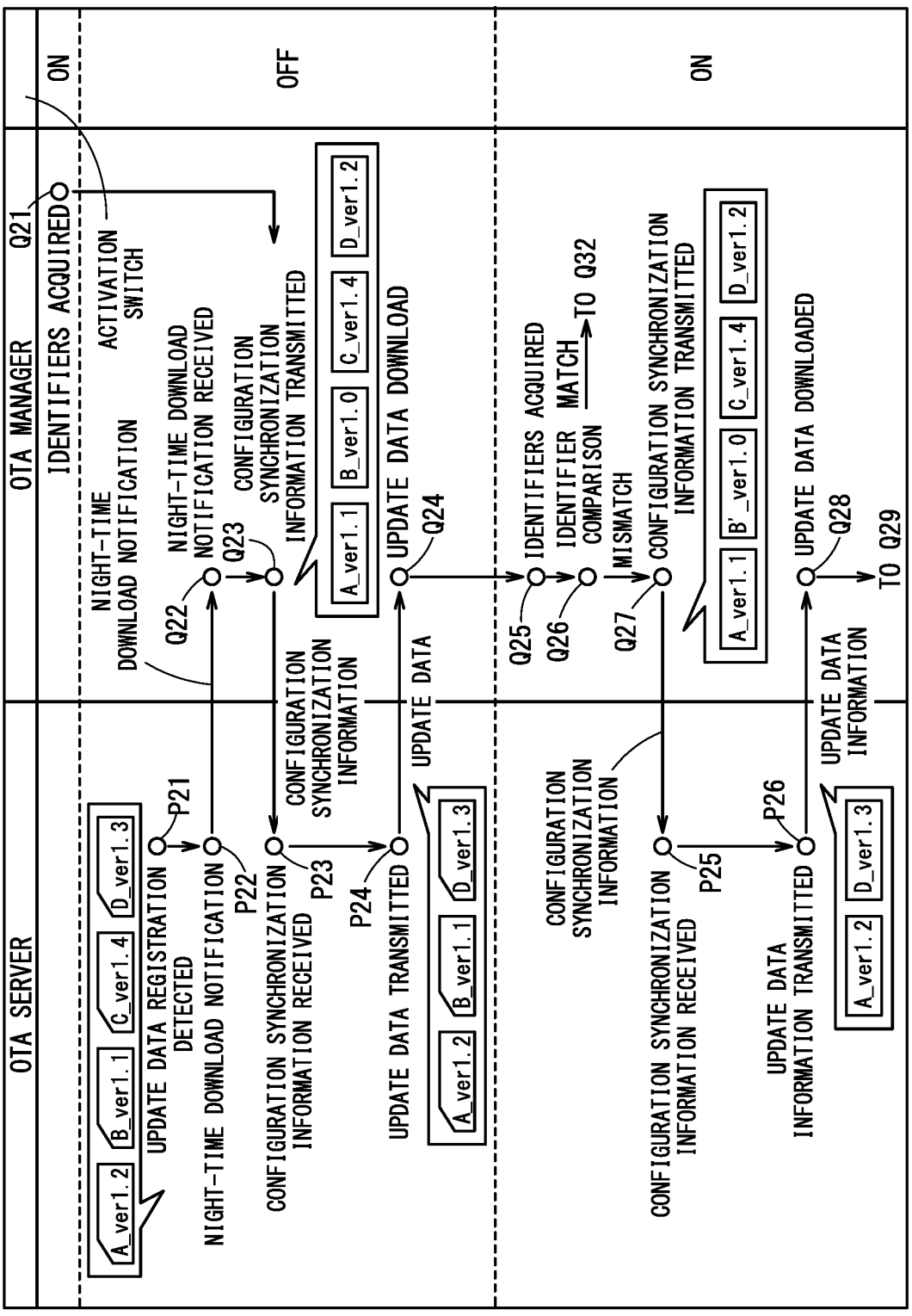
FIG. 4 is a flow diagram showing a software update flow for a night-time download.
Figure 5:
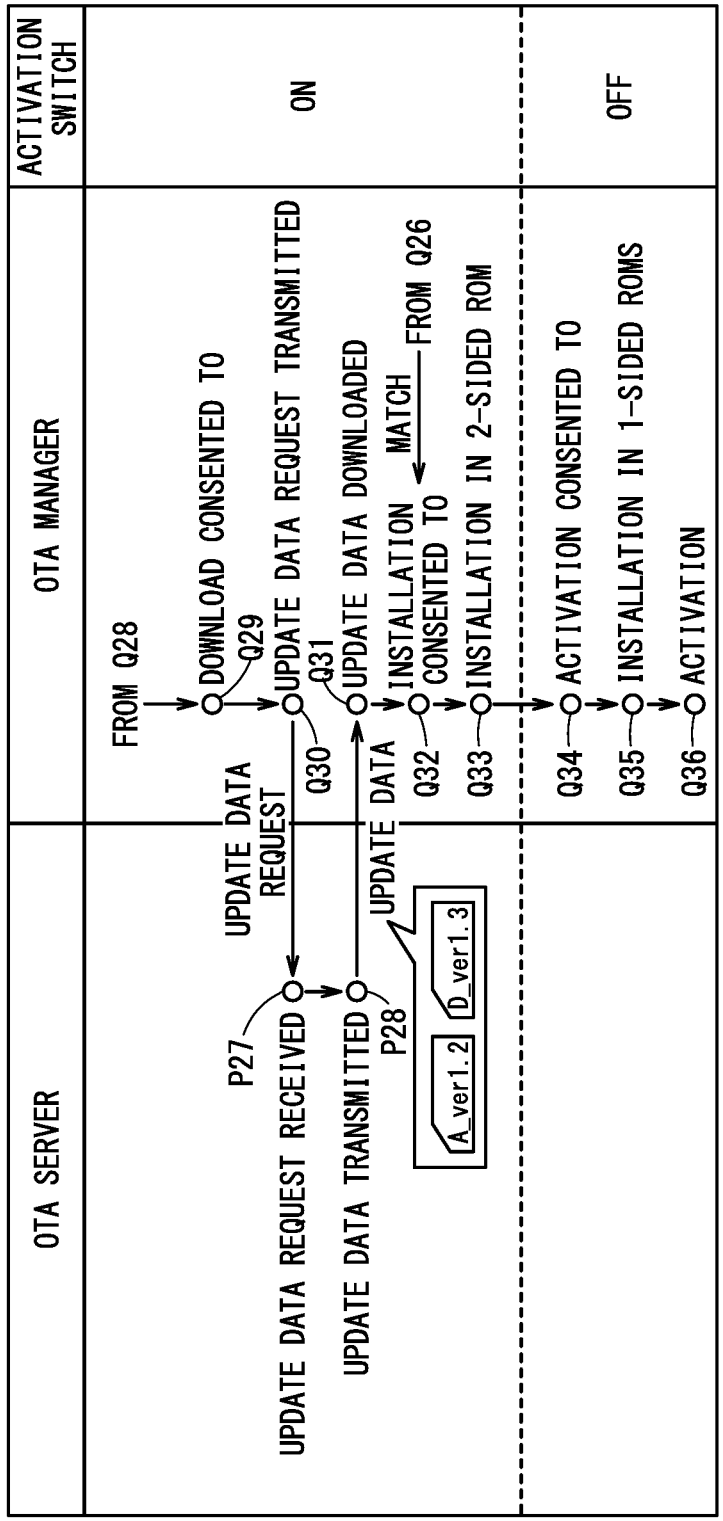
FIG. 5 is a flow diagram showing a software update flow for a night-time download.

FIGS. 4 and 5 are flow charts showing the software update flow performed during a night-time download. The night-time download refers to downloading the update data 24 when the activation switch 64 is OFF at night. A download of a relatively large amount of update data 24 is performed at night, when the communication cost of cellular communication is relatively low and traffic on the communication lines is relatively low.

When the night-time download is being performed, the activation switch 64 is OFF and the battery 60 cannot be charged. Therefore, even though the OTA manager 20 is being driven, the night-time download is performed in a state where the other ECUs 16 are stopped.

When the OTA server 12 detects the registration of the update data 24 that is the target of the night-time download (P21), the OTA server 12 transmits a night-time download notification to the OTA manager 20 (P22).

Upon receiving the night-time download notification when the activation switch 64 is OFF (Q22), the OTA manager 20 transmits the configuration synchronization information to the OTA server 12 (Q23). The configuration synchronization information transmitted at this time is generated based on the identifier of each ECU 16 acquired by the OTA manager 20 (Q21), before the activation switch 64 is switched from ON to OFF. If an ECU 16 is not in a driven state, the OTA manager 20 cannot acquire the identifier of each ECU 16. Therefore, the configuration synchronization information is generated using the identifier of each ECU 16 acquired by the OTA manager 20 in advance when the activation switch 64 is ON.

Upon receiving the configuration synchronization information (P23), the OTA server 12 selects the update data 24*a*, the update data 24*b*, and the update data 24*d* as the software update data 24 to be transmitted. The OTA server 12 then transmits the selected update data 24*a*, update data 24*b*, and update data 24*d* to the OTA manager 20 (P24).

The OTA manager 20 downloads the update data 24*b* (Q24). With the night-time download, the download is performed without being consented to by the user. Therefore, cellular communication that does not incur a monetary cost to the user is used for the night-time download.

When the activation switch 64 is switched from OFF to ON, the OTA manager 20 acquires the identifier of each ECU 16 (Q25). The OTA manager 20 compares (Q26) the identifier (Q23) included in the configuration synchronization information transmitted from the OTA server 12 before the activation switch 64 was switched from OFF to ON to the identifier (Q25) acquired after the activation switch 64 was switched from OFF to ON.

Here, if the ECU_B 16*b* has been replaced with an ECU_B' 16*b*' while the activation switch 64 is OFF, such as shown in FIG. 1, the result of the ECU 16 identifier comparison is a mismatch. If the result of the ECU 16 identifier comparison is a mismatch, the OTA manager 20 transmits the configuration synchronization information to the OTA server 12 (Q27). The configuration synchronization information transmitted here is generated based on the identifier (Q25) acquired after the activation switch 64 was switched from OFF to ON.

Upon receiving the configuration synchronization information (P25), the OTA server 12 selects the update data 24*a* and the update data 24*d* as the software update data 24 to be transmitted. The OTA server 12 then transmits the update data information of the selected update data 24*a* and update data 24*d* to the OTA manager 20 (P26).

The OTA manager 20 downloads the update data information (Q28). When the download is consented to by the user (Q29), the OTA manager 20 transmits the update data request to the OTA server 12 (Q30).

Upon receiving the update data request (P27), the OTA server 12 transmits the selected update data 24*a* and update data 24*d* to the OTA manager 20 (P28).

The OTA manager 20 downloads the update data 24*a* and the update data 24*d* (Q31). When the installation is consented to by the user (Q32), the OTA manager 20 installs the software in the ECU_A 16*a* of the two-sided ROM (Q33).

When the activation switch 64 is switched from ON to OFF and the activation is consented to by the user (Q34), the OTA manager 20 installs the software in the ECU_D 16*d* of the one-sided ROM (Q35). After this, the OTA manager 20 activates the software that has been installed in the ECU_A 16*a* and the ECU_D 16*d* (Q36).

If the ECU_B 16*b* has not been replaced while the activation switch 64 was OFF, the result of the ECU 16 identifier comparison of Q26 in FIG. 4 is a match. If the result of the ECU 16 identifier comparison is a match, when the installation is consented to by the user (Q32), the OTA manager 20 installs the software in the ECU_A 16*a* of the two-sided ROM (Q33).

[Software Update Process for Normal Download]

Figure 6:
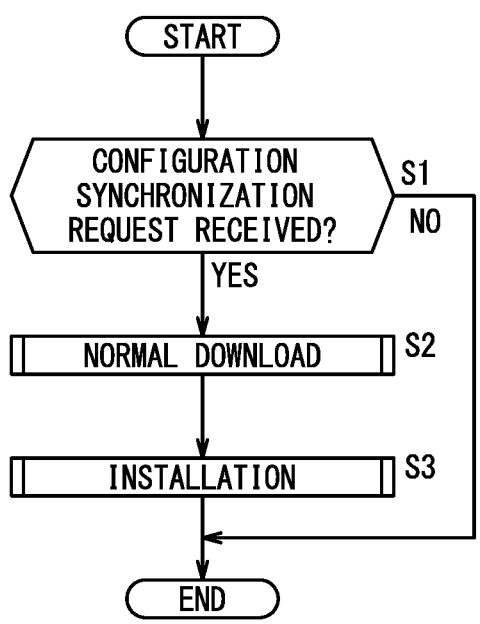
FIG. 6 is a flow chart showing the flow of the software update process for a normal download performed by the OTA manager.

FIG. 6 is a flow chart showing the flow of the software update process for a normal download performed by the OTA manager 20. This process is performed at prescribed periods when the activation switch 64 is ON.

At step S1, the OTA manager 20 determines whether the configuration synchronization request has been received from the OTA server 12. The process moves to step S2 if the configuration synchronization request has been received, and the software update process ends if the configuration synchronization request has not been received.

At step S2, the OTA manager 20 calls up a sub routine of the normal download process, and moves to step S3.

At step S3, the OTA manager 20 calls up a sub routine of the installation process, and ends the software update process.

Figure 7:
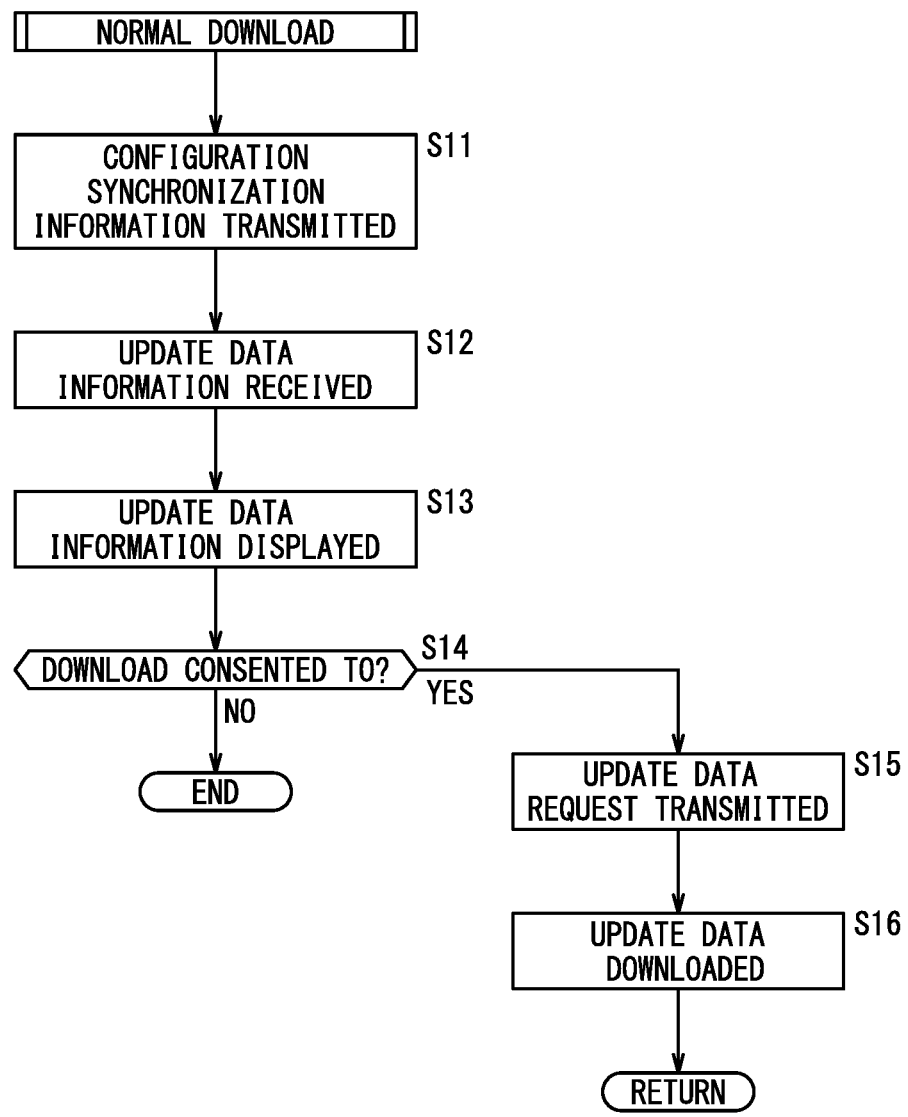
FIG. 7 is a flow chart showing the flow of a normal download process performed by the OTA manager.

FIG. 7 is a flow chart showing the flow of the normal download process performed by the OTA manager 20.

At step S11, the OTA manager 20 transmits the configuration synchronization information to the OTA server 12, and moves to step S12.

At step S12, the OTA manager 20 receives the update data information from the OTA server 12, and moves to step S13.

Figure 10:
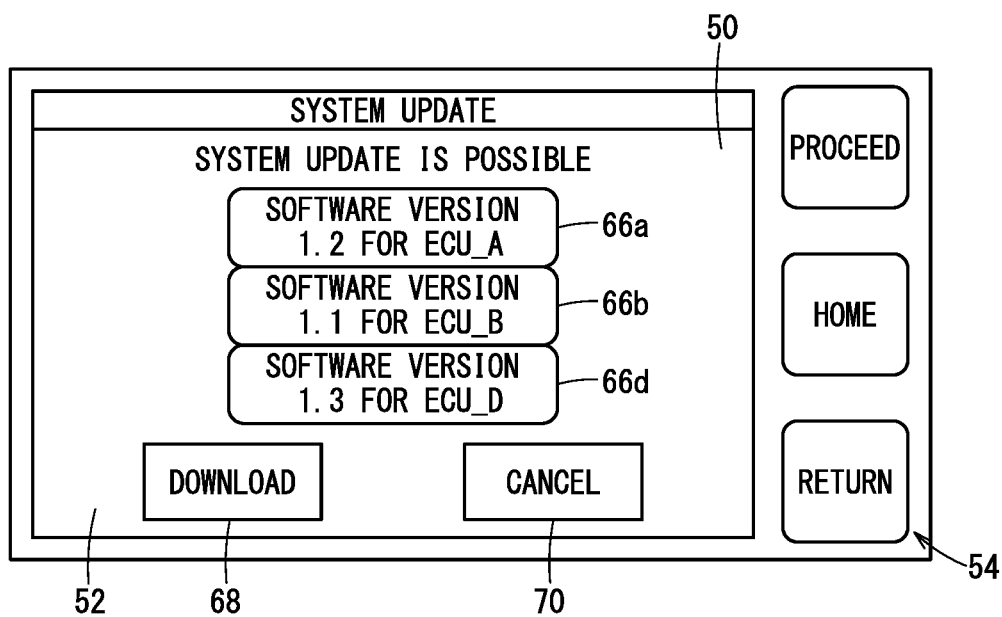
FIG. 10 shows the touch screen display with the update data information displayed in the screen.

At step S13, the OTA manager 20 commands the IVI system 46 to display the update data information received at step S12 in the screen 50 of the touch screen display 48, and moves to step S14. FIG. 10 shows the touch screen display 48 with the update data information displayed in the screen 50. The information concerning the software to be updated (information 66*a*, information 66*b*, and information 66*d* in FIG. 10) and buttons for selecting whether to consent to the download of the update data 24 (button 68 and button 70 in FIG. 10) are displayed in the screen 50. When the user touches the button 68 in the screen 50, this indicates that the user has consented to the download of the update data 24. The display of the update data information is not limited to the display in the screen 50 of FIG. 10, and may be another display.

At step S14, the OTA manager 20 determines whether the download of the update data 24 has been consented to by the user. The process moves to step S15 if the download has been consented to, and the software update process ends if the download has been refused.

At step S15, the OTA manager 20 transmits the update data request to the OTA server 12, and moves to step S16.

At step S16, the OTA manager 20 downloads the update data 24 that has been transmitted from the OTA server 12 and ends the normal download process.

Figure 8:
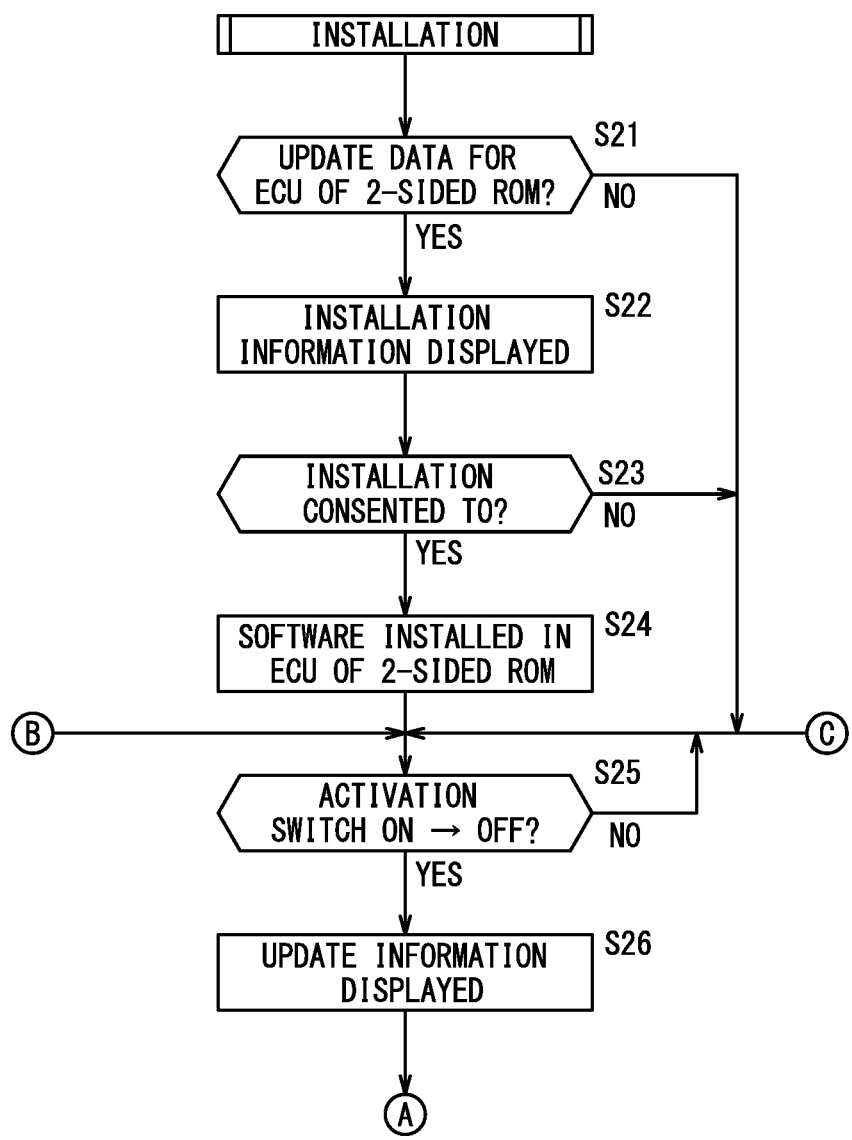
FIG. 8 is a flow chart showing the flow of an installation process performed by the OTA manager.
Figure 9:
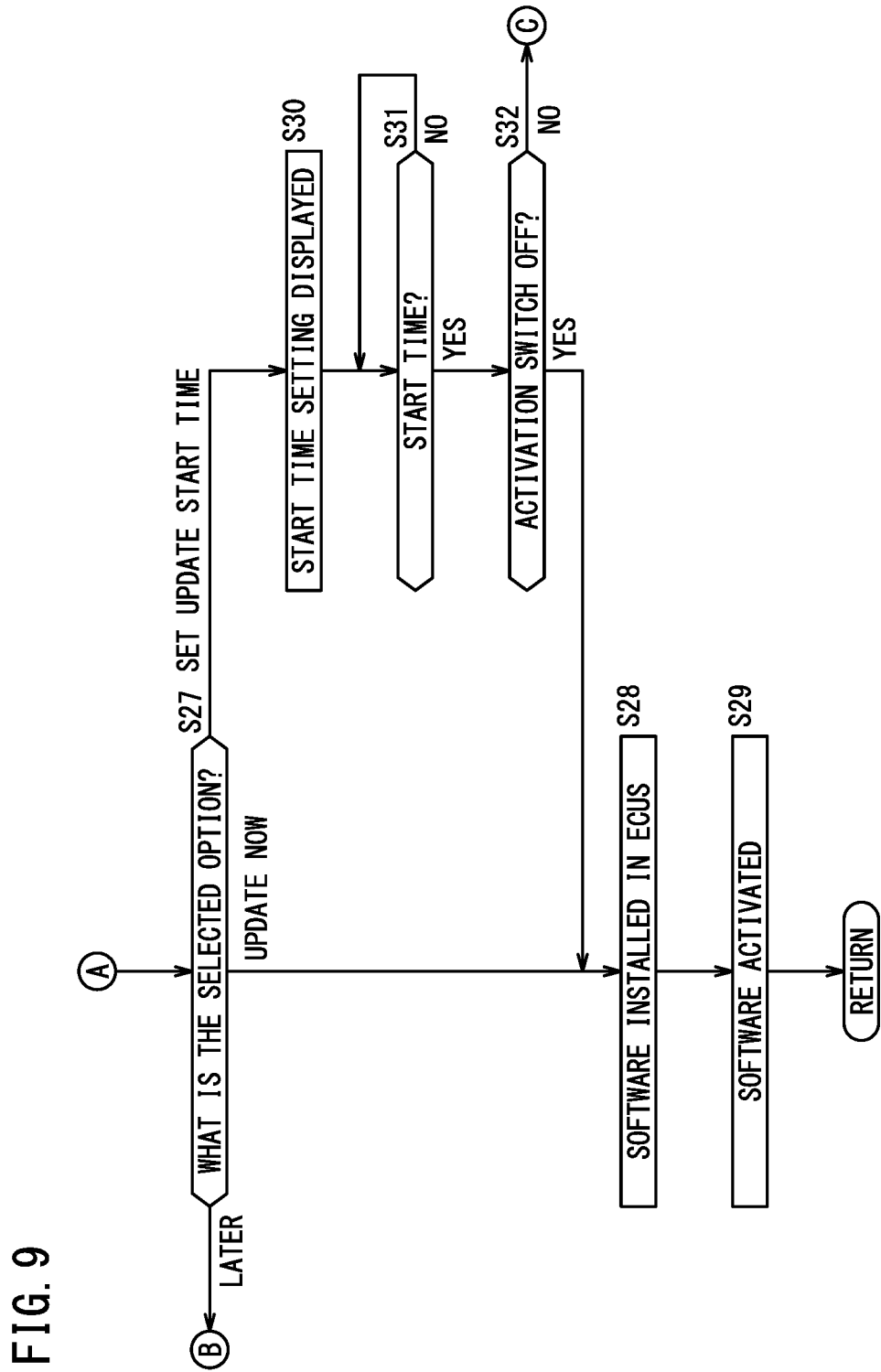
FIG. 9 is a flow chart showing the flow of the installation process performed by the OTA manager.

FIGS. 8 and 9 are flow charts showing the flow of the installation process performed by the OTA manager 20.

At step S21, the OTA manager 20 determines whether there is update data 24 for the software of the ECU 16 of the two-sided ROM. The process moves to step S22 if there is update data 24 for the software of the ECU 16 of the two-sided ROM, and the process moves to step S25 if there is no update data 24 for the software of the ECU 16 of the two-sided ROM.

Figure 11:
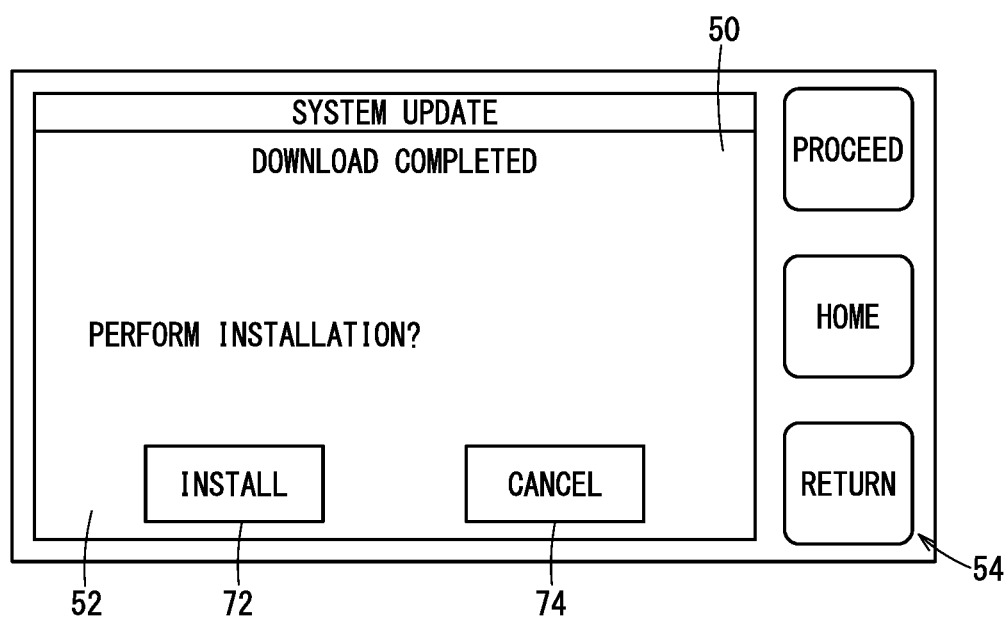
FIG. 11 shows the touch screen display with the installation information displayed in the screen.

At step S22, the OTA manager 20 commands the IVI system 46 to display the installation information in the screen 50 of the touch screen display 48, and moves to step S23. FIG. 11 shows the touch screen display 48 with the installation information displayed in the screen 50. Buttons for selecting whether to consent to the software installation (button 72 and button 74 in FIG. 11) are displayed in the touch screen display 48. When the user touches the button 72 on the screen 50, this indicates that the software installation has been consented to. The display of the installation information is not limited to the display in the screen 50 of FIG. 11, and may be another display.

At step S23, the OTA manager 20 determines whether the installation of the update data 24 has been consented to by the user. The process moves to step S24 if the installation has been consented to, and the process moves to step S25 if the installation has been refused.

At step S24, the OTA manager 20 installs the software in the ECU_16 of the two-sided ROM, and the process moves to step S25.

At step S25, the OTA manager 20 determines whether the activation switch 64 has been switched from ON to OFF. The process moves to step S26 if the activation switch 64 has been switched from ON to OFF, and the process of step S25 is repeated to wait until the activation switch 64 is switched from ON to OFF if the activation switch 64 is ON.

Figure 12:
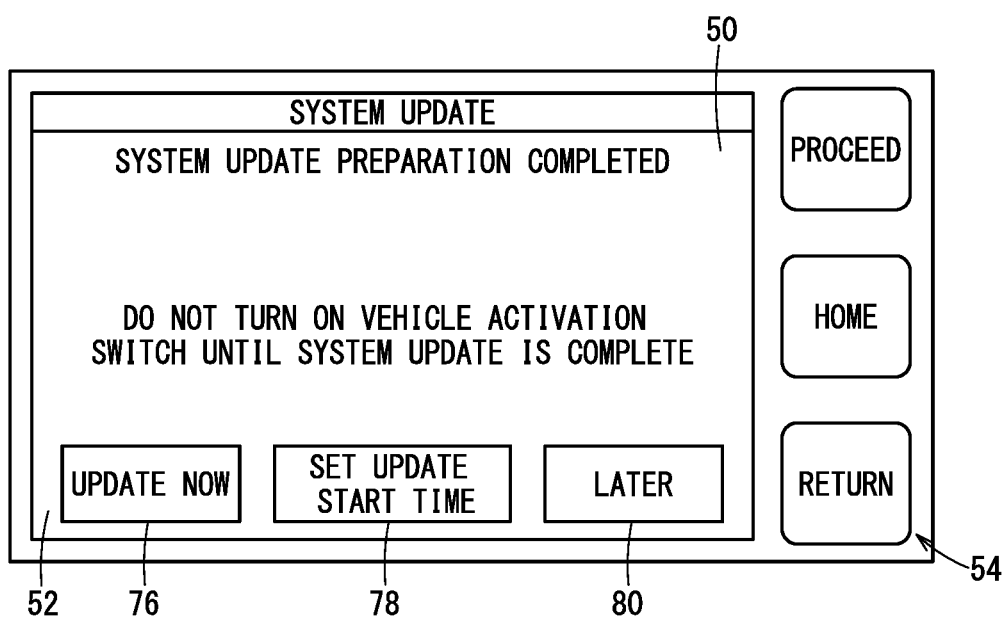
FIG. 12 shows the touch screen display with the update information displayed in the screen.

At step S26, the OTA manager 20 commands the IVI system 46 to display the update information in the screen 50 of the touch screen display 48, and moves to step S27. FIG. 12 shows the touch screen display 48 with the update information displayed in the screen 50. Three options are provided as software update timings in the screen 50. The provided options are "update now", which sets the update timing to be immediate, "set update start time", which sets the update timing to be any timing set by the user, and "later", which does not set an update timing. Buttons for selecting these options (button 76, button 78, and button 80 in FIG. 12) are displayed in the touch screen display 48. When the user touches any one of the button 76, the button 78, and the button 80 in the screen 50, this indicates that the button 76, button 78, or button 80 touched by the user is the selected option. The display of the update information is not limited to the display in the screen 50 of FIG. 12, and may be another display.

At step S27, the OTA manager 20 determines the option selected by the user. The process moves to step S28 when the selected option is "update now". The process moves to step S30 when the selected option is "set update start time". The process returns to step S25 when the selected option is "later".

At step S28, the OTA manager 20 installs the software in the ECUs 16 of the one-sided ROMs, and moves to step S29. If the installation was refused at step S23, at step S28, the OTA manager 20 installs the software in the ECU 16 of the two-sided ROM as well.

At step S29, the OTA manager 20 activates the software of each ECU 16, and ends the installation process.

Figure 13:
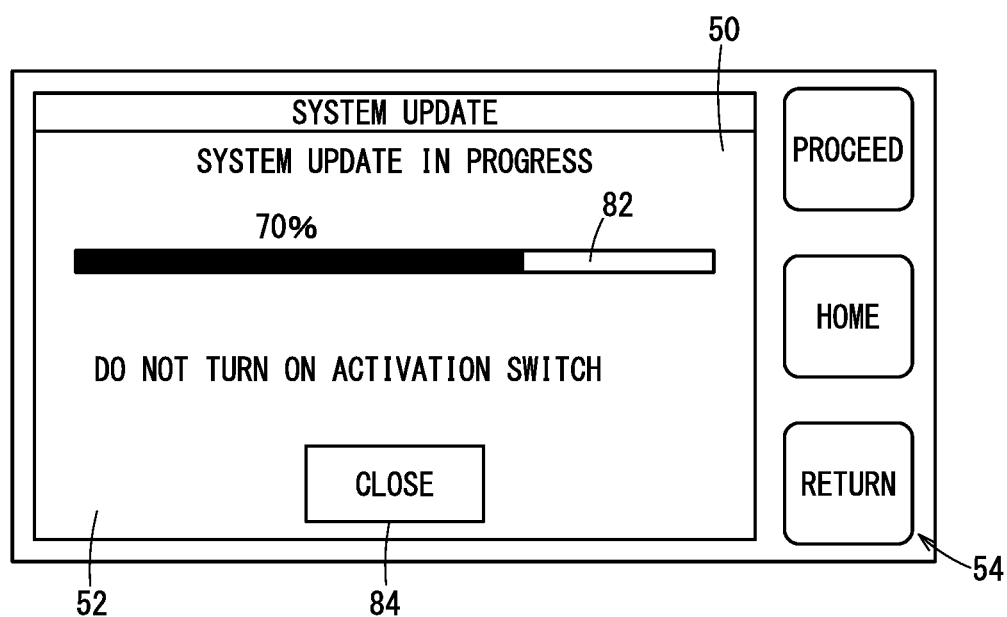
FIG. 13 shows the touch screen display with the software update status displayed in the screen.

The OTA manager 20 commands the IVI system 46 to display the software update status in the touch screen display 48 during the installation of step S28 and the activation of step S29. FIG. 13 shows the touch screen display 48 with the software update status displayed in the screen 50. A progress bar 82 showing the software update status and a button 84 for closing the display of the screen 50 are displayed in the screen 50. When the software update status is being displayed in the screen 50, manipulation of the physical button 54 for switching the display of the screen 50 is disabled. Due to this, when the activation switch 64 is OFF, the user cannot switch to a display other than the software update status. The display of the software update status is not limited to the display in the screen 50 of FIG. 13, and may be another display.

If the activation switch 64 has been switched from OFF to ON during the installation of step S28 or the activation of step S29, the OTA manager 20 suspends the corresponding installation or activation and returns to step S25.

Figure 14:
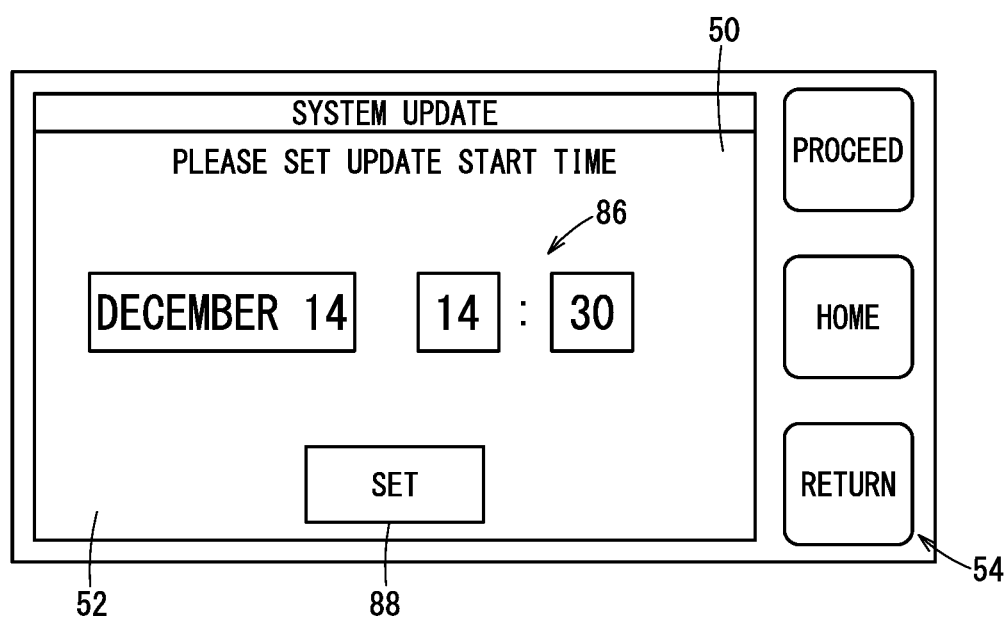
FIG. 14 shows the touch screen display with the start time setting displayed in the screen.

At step S30, which is moved to when the selected option is "set update start time", the OTA manager 20 commands the IVI system 46 to display the start time setting in the screen 50 of the touch screen display 48, and moves to step S31. FIG. 14 shows the touch screen display 48 with the start time setting displayed in the screen 50. Selection boxes 86 for selecting the date and time to start the update and a setting button 88 for setting the update start time to the selected date and time are displayed in the touch screen display 48. The display of the start time setting is not limited to the display in the screen 50 of FIG. 14, and may be another display.

At step S31, the OTA manager 20 determines whether the set update start time has been reached. The process moves to step S32 if the set update start time has been reached, and the process of step S31 repeats to wait until the set update start time is reached if the set update start time has not yet been reached. If the activation switch 64 has been switched from OFF to ON before the set update start time is reached, the battery manager 62 manages the SOC of the battery 60 in a manner to approach the upper limit of a prescribed range.

At step S32, the OTA manager 20 determines whether the activation switch 64 is OFF. The process moves to step S28 when the activation switch 64 is OFF, and the process returns to step S25 when the activation switch 64 is ON.

[Software Update Process for Night-Time Download]

Figure 15:
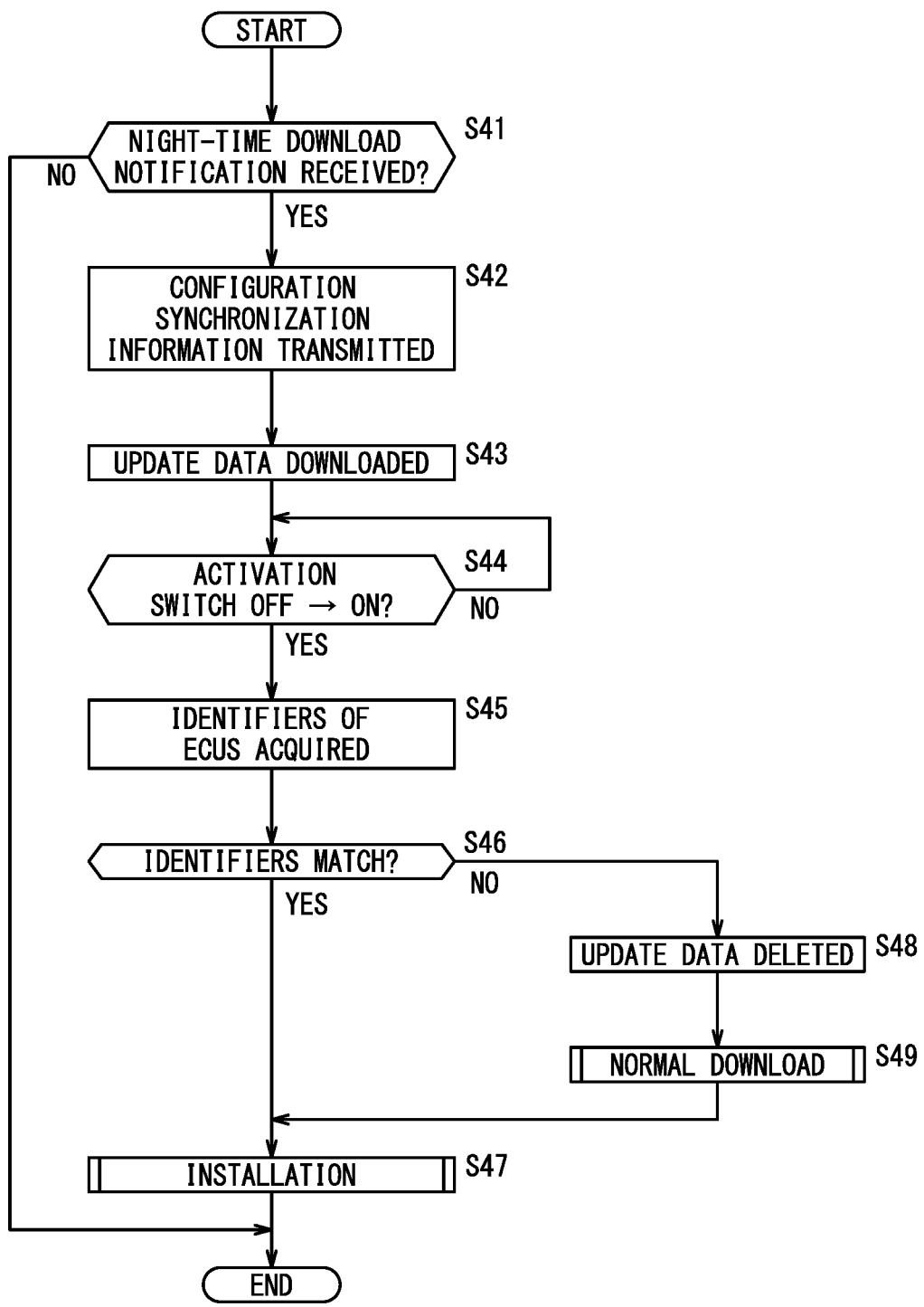
FIG. 15 is a flow chart showing the flow of the software update process for a night-time download performed by the OTA manager.

FIG. 15 is a flow chart showing the flow of the software update process for a night-time download performed by the OTA manager 20. This process is performed at prescribed periods at night (e.g., from 22:00 to 5:00 on the following day), when the activation switch 64 is OFF and the communication cost of cellular communication is relatively low.

At step S41, the OTA manager 20 determines whether a night-time download notification has been received from the OTA server 12. The process moves to step S42 if the night-time download notification has been received, and the software update process ends if a night-time download notification is not received.

At step S42, the OTA manager 20 transmits the configuration synchronization information to the OTA server 12, and moves to step S43. The configuration synchronization information transmitted here is generated based on the identifier of each ECU 16 acquired before the activation switch 64 was switched from ON to OFF.

At step S43, the OTA manager 20 downloads the update data 24 that has been transmitted from the OTA server 12, and moves to step S44.

At step S44, the OTA manager 20 determines whether the activation switch 64 has been switched from OFF to ON. The process moves to step S45 if the activation switch 64 has been switched from OFF to ON, and the process of step S44 is repeated to wait until the activation switch 64 is switched from OFF to ON if the activation switch 64 is OFF.

At step S45, the OTA manager 20 acquires the identifier of each ECU 16, and moves to step S46.

At step S46, the OTA manager 20 makes a comparison between the identifier of each ECU 16 transmitted as the configuration synchronization information at step S42 and the identifier of each ECU 16 acquired at step S45. The process moves to step S47 if the result of the ECU 16 identifier comparison is a match, and the process moves to step S48 if the result of the ECU 16 identifier comparison is a mismatch.

At step S47, the OTA manager 20 calls up a sub routine of the installation process of FIGS. 8 and 9, and ends the software update process.

At step S48, the OTA manager 20 deletes the update data 24 downloaded at step S43, and moves to step S49.

At step S49, the OTA manager 20 calls up a sub routine of the normal download process of FIG. 7, and moves to step S47.

[Operational Effects]

The download of the update data 24 from the OTA server 12 to the OTA manager 20 is performed through the communication lines. Therefore, in order to suppress the communication cost when the size of the update data 24 is relatively large, it is preferable for the download of the update data 24 to be performed during night time when the communication cost is relatively low.

In order to download the update data 24 corresponding to the ECUs 16 of the vehicle 10, the OTA manager 20 must notify the OTA server 12 about the identifiers of the ECUs 16 loaded in the vehicle 10. On the other hand, the activation switch 64 of the vehicle 10 is usually OFF at night, and the OTA manager 20 cannot acquire the identifier of each ECU 16 of the vehicle 10 when the activation switch 64 is OFF. Therefore, if the download of the update data 24 is to be performed when the activation switch 64 is OFF, the OTA manager 20 notifies OTA server 12 about the identifiers of the ECUs 16 acquired before the activation switch 64 was switched from ON to OFF.

If a case were assumed in which an ECU 16 is replaced after the activation switch 64 has been switched from ON to OFF, the ECU 16 whose identifier was provided to the OTA server 12 by the OTA manager 20 after the activation switch 64 was switched from ON to OFF would differ from the ECU 16 loaded in the vehicle 10. Therefore, when an attempt is made to update the software of the ECU 16 using the update data 24 downloaded when the activation switch 64 was OFF, there is a concern that this software update cannot be performed. Furthermore, even if the software of this ECU 16 were to be updated, there is a concern that the software would not operate correctly.

Therefore, with the software update system 14 of the present embodiment, the OTA manager 20 makes a comparison between the identifier of each ECU 16 transmitted at step S42 of FIG. 15 and the identifier of each ECU 16 acquired at step S45.

If the result of the comparison is a match, the OTA manager 20 installs the software of each ECU 16 using the update data 24 downloaded when the activation switch 64 was OFF.

If the result of the comparison is a mismatch, the OTA manager 20 deletes the update data 24 downloaded when the activation switch 64 was OFF. The OTA manager 20 then downloads the update data 24 using the normal download when the activation switch 64 is ON, and installs the software in each ECU 16 using the downloaded update data 24. Due to this, even when the result of the comparison is a mismatch, the OTA manager 20 can download the update data 24 corresponding to each ECU 16. Furthermore, the OTA manager 20 can install the software in each ECU 16 using the update data 24 corresponding to this ECU 16.

[Modifications]

At step S46 of FIG. 15, if the result of the ECU 16 identifier comparison is a mismatch, there is a concern that an ECU 16 has been replaced when the activation switch 64 was OFF and an ECU 16 used for fraudulent purposes has been attached by a third party. Therefore, if the result of the ECU 16 identifier comparison is a mismatch, the OTA manager 20 may perform a security check to investigate whether each attached ECU 16 is attached for fraudulent purposes. In this way, it is possible to discover an ECU 16 attached for fraudulent purposes.

At step S46 of FIG. 15, if the result of the ECU 16 identifier comparison is a mismatch, the OTA manager 20 may command the IVI system 46 to display a message indicating that the ECU 16 was replaced when the activation switch 64 was OFF in the screen 50 of the touch panel 52. In this way, the user can be made aware that the ECU 16 was replaced.

Furthermore, at step S46 of FIG. 15, if the result of the ECU 16 identifier comparison is a mismatch, the OTA manager 20 may notify the OTA server 12 that the ECU 16 was replaced when the activation switch 64 was OFF. In this way, with the OTA server 12 as well, it is possible to acquire the information indicating that an ECU 16 of the vehicle 10 has been replaced.

The OTA manager 20 may monitor the operation of each ECU 16, collect a log of the presence or lack of operation of each ECU 16, and store this log in the storage 22. The ECU 16 must be activated after replacement in order to check the connection between the ECU 16 and the communication lines (high-speed communication line 26, low-speed communication line 28, and backup communication line 30). By checking the log of the presence or lack of operation of each ECU 16, it is possible to identify the timing at which the ECU 16 was replaced. By inputting a predetermined PIN code, it is possible to check the content of this log. In this way, only a mechanic or the like at the vehicle 10 dealership who knows the PIN code can check the log.

If the result of the ECU 16 identifier comparison is a mismatch, the OTA manager 20 may disable the manipulation by which the user switches the activation switch 64 from OFF to ON. In this case, the OTA manager 20 may command the IVI system 46 to display a message indicating that the manipulation of the activation switch 64 is disabled in the screen 50 of the touch panel 52. Furthermore, the OTA manager 20 may command the IVI system 46 to display contact information of the vehicle 10 dealership in the screen 50 of the touch panel 52. In this way, the user can receive a diagnosis of the vehicle 10 by the mechanic or the like of the vehicle 10 dealership, and it is possible to quickly resolve a situation where the vehicle 10 cannot be activated by the user.

In the present embodiment, when the night-time download notification transmitted from the OTA server 12 is received by the OTA manager 20 during the night time when the activation switch 64 is OFF, the download of the update data 24 is performed. However, this timing is not limited to the night time, and the download of the update data 24 may be performed any time when the activation switch 64 is OFF. In this case, the user outside the vehicle 10 may allow the download of the update data 24 using the terminal 42 carried by the user.

Furthermore, if the activation switch 64 is ON and it is predicted that a night-time download is to be performed soon, e.g., if the activation switch 64 is ON within a time period in which the night-time download is to be performed, the battery manager 62 may manage the SOC of the battery 60 to approach the upper limit of a prescribed range. In this way, when the night-time download is to be performed after the activation switch 64 has been switched from ON to OFF, it is possible to prevent an excessive decrease in the SOC of the battery 60 due to the download of the update data 24.

[Technical Concepts Obtainable from the Present Embodiments]

The following is a record of the technical concepts that can be understood from the embodiments described above.

The vehicle (10) includes the plurality of electronic control units (16) and updates software of each electronic control unit with the update data (24) transmitted from the server (12) via a communication line, and the vehicle includes the update managing section (20) that, when the activation switch (64) of the vehicle is OFF, transmits a unique identifier of each electronic control unit acquired before the activation switch was switched from ON to OFF to the server via the communication line and receives the update data corresponding to the transmitted identifiers from the server via the communication line, wherein, after the activation switch has been switched from OFF to ON, the update managing section makes a comparison between the identifiers transmitted to the server before the activation switch was switched from OFF to ON and the identifiers acquired after the activation switch was switched from OFF to ON.

In the vehicle described above, if the identifiers transmitted to the server before the activation switch was switched from OFF to ON and the identifiers acquired after the activation switch was switched from OFF to ON are different from each other, after the activation switch has been switched from OFF to ON, the update managing section may delete the update data received before the activation switch was switched from OFF to ON, transmit the identifiers acquired after the activation switch was switched from OFF to ON to the server via the communication line, and receive the update data corresponding to the transmitted identifiers from the server via the communication line.

In the vehicle described above, if the activation switch is OFF and a user outside the vehicle has allowed the update of the software via a terminal carried by the user, the update managing section may transmit the unique identifier of each electronic control unit acquired before the activation switch was switched from ON to OFF to the server via the communication line, and receive the update data corresponding to the transmitted identifiers from the server via the communication line.

In the vehicle described above, the update managing section may include the storage section (22) for storing the received update data; store the received update data in the storage section; and check security of the electronic control units if the identifiers transmitted to the server before the activation switch was switched from OFF to ON and the identifiers acquired after the activation switch was switched from OFF to ON are different from each other.

The vehicle described above may include the notifying section (50) that provides notification to a user, and if the identifiers transmitted to the server before the activation switch was switched from OFF to ON and the identifiers acquired after the activation switch was switched from OFF to ON are different from each other: the notifying section may provide notification to the user and the update managing section may provide notification to the server via the communication line.

In the vehicle described above, the update managing section may monitor operation of each electronic control unit and collect a log of presence or lack of operation of the electronic control units.

The vehicle described above may include the notifying section that provides notification to a user, and if the identifiers transmitted to the server before the activation switch was switched from OFF to ON and the identifiers acquired after the activation switch was switched from OFF to ON are different from each other: the update managing section may disable manipulation of the user for switching the activation switch from OFF to ON; and the notifying section may notify the user that the manipulation of the activation switch is disabled and notifies the user about contact information of a dealership of the vehicle.

The vehicle described above may include the battery managing section (62) that manages a state of charge of the battery (60), which supplies power to the update managing section, to be within a prescribed range; and the battery managing section may manage the state of charge such that the state of charge approaches an upper limit of the prescribed range when the activation switch is ON.

The software update method for, in the vehicle (10) that includes the plurality of electronic control units (16), updating software of each electronic control unit with the update data (24) transmitted from the server (12) via a communication line, includes: when an activation switch of the vehicle is OFF, transmitting a unique identifier of each electronic control unit acquired before the activation switch was switched from ON to OFF to the server via the communication line and receiving the update data corresponding to the transmitted identifiers from the server via the communication line; and after the activation switch has been switched from OFF to ON, making a comparison between the identifiers transmitted to the server before the activation switch was switched from OFF to ON and the identifiers acquired after the activation switch was switched from OFF to ON.

The present invention is not particularly limited to the embodiments described above, and various modifications are possible without departing from the essence and gist of the present invention.

What is claimed is:

1. A software update system for a vehicle, comprising:
a plurality of electronic control units installed in the vehicle, with each electronic control unit of the plurality of electronic control units having a unique identifier stored electronically in a memory thereof;
an intra-vehicle communication line installed on the vehicle that connects the plurality of electronic control units and configured to provide a medium for electronically exchanging data including at least the unique identifier of each electronic control unit connected thereto;
an activation switch of the vehicle having ON and OFF states;
a server that provides updated program data for a given list of electronic control unit unique identifiers via an external communication line that is external to the vehicle, the given list being one of a current list of unique identifiers, which includes a unique identifier of each electronic control unit that is currently installed on the vehicle at a current point in time and a previous list of unique identifiers, which includes a unique identifier of each electronic control unit that was installed on the vehicle at a previous point in time; and one or more processors configured to execute computer-executable instructions for installing the updated program data to each electronic control unit of the plurality of electronic control units,
wherein the one or more processors execute the computer-executable instructions to:
recognize that the activation switch changes from the ON state to the OFF state;
transmit, at a time in which the activation switch is recognized to have changed from the ON to the OFF state, the previous list of unique identifiers that was acquired before the activation switch was recognized to have switched from ON state to the OFF state to the server via the external communication line and receive the updated program data from the server via the external communication line;
recognize that the activation switch changes from the OFF state to the ON state;
electronically acquire via the intra-vehicle communication line, at a time in which the activation switch is recognized to have changed from the OFF to the ON state, the unique identifier of each electronic control unit of the plurality of electronic control units installed on the vehicle at the present time, and store the acquired unique identifiers as the current list of unique identifiers;
make a comparison between the previous list of unique identifiers and the current list of unique identifiers;
determine based on the comparison that the previous list of unique identifiers and the current list of unique identifiers are one of different from each other and equal to each other;
in the case that it is determined that the previous list of unique identifiers and the current list of unique identifiers are different from each other, delete the updated program data; and
in the case that it is determined that the previous list of unique identifiers and the current list of unique identifiers are equal to each other, install the updated program data to the plurality of electronic control units.

2. The software update system according to claim 1, wherein the one or more processors further execute the computer-executable instructions to:
transmit the current list of unique identifiers to the server via the communication line; and
receive updated program data associated with the current list of unique identifiers from the server via the communication line.

3. The software update system according to claim 1, further comprising a terminal carried by a user outside of the vehicle and communicably coupled to the one or more processors, the terminal configured to accept input from the user regarding whether to allow or deny the installing of the updated program data,
wherein the one or more processors further execute the computer-executable instructions to:
recognize that the activation switch is in the OFF state;
determine that the user has allowed the installing of the updated program data based on the input from the user; and
upon recognizing that the activation switch is in the OFF state and that the user has allowed the installing of the updated program data, transmit the previous list of unique identifiers to the server via the communication line, and receive the updated program data associated with the previous list of unique identifiers from the server via the communication line.

4. The software update system according to claim 1, wherein if it is determined based on the comparison that the previous list of unique identifiers and the current list of unique identifiers are different from each other, the one or more processors check security of the plurality of electronic control units.

5. The software update system according to claim 1, wherein if it is determined based on the comparison that the previous list of unique identifiers and the current list of unique identifiers are different from each other, the one or more processors:
control a notifying device to provide notification to the user; and
provide notification to the server via the communication line.

6. The software update system according to claim 1, wherein the one or more processors monitor operation of each electronic control unit of the plurality of electronic control units and collect a log of presence or lack of operation thereof.

7. The software update system according to claim 1, wherein if it is determined based on the comparison that the previous list of unique identifiers and the current list of unique identifiers are different from each other, the one or more processors:
disable manipulation by the user for switching the activation switch from the OFF state to the ON state; and
notify the user that the manipulation of the activation switch is disabled and control a notifying device to notify the user about contact information of a dealership of the vehicle.

8. The software update system according to claim 1, further comprising a second set of one or more processors that are different from the one or more processors,
wherein the second set of one or more processors:
manage a state of charge of a battery, which supplies power to the one or more processors, to be within a prescribed range; and
manage the state of charge in a manner that the state of charge approaches an upper limit of the prescribed range when the activation switch is in the ON state.

9. A software update method for a vehicle that includes:
a plurality of electronic control units installed therein, with each electronic control unit of the plurality of electronic control units having a unique identifier stored electronically in a memory thereof;
an intra-vehicle communication line installed on the vehicle that connects the plurality of electronic control units and configured to provide a medium for electronically exchanging data including at least the unique identifier of each electronic control unit connected thereto; and
an activation switch of the vehicle having ON and OFF states, wherein the vehicle communicates with a server that provides updated program data for a given list of electronic control unit unique identifiers via an external communication line that is external to the vehicle, the given list being one of a current list of unique identifiers, which includes a unique identifier of each electronic control unit that is currently installed on the vehicle at a current point in time and a previous list of unique identifiers, which includes a unique identifier of each electronic control unit that was installed on the vehicle at a previous point in time, the method comprising:

recognizing that the activation switch of the vehicle changes from an ON state to an OFF state;

transmitting, at a time in which the activation switch is recognized to have changed from the ON to the OFF state, the previous list of unique identifiers that was acquired before the activation switch was recognized to have switched from ON state to the OFF state to a server via the external communication line and receiving the updated program data from the server via the external communication line;

recognizing that the activation switch changes from the OFF state to the ON state;

electronically acquiring via the intra-vehicle communication line, at a time in which the activation switch is recognized to have changed from the OFF to the ON state, the unique identifier of each electronic control unit of the plurality of electronic control units installed on the vehicle at the present time, and store the acquired unique identifiers as the current list of unique identifiers;

making a comparison between the previous list of unique identifiers and the currently list of unique identifiers;

determining based on the comparison that the previous list of unique identifiers and the current list of unique identifiers are one of different from each other and equal to each other;

in the case that it is determined that the previous list of unique identifiers and the current list of unique identifiers are different from each other, deleting the updated program data; and in the case that it is determined that the previous list of unique identifiers and the current list of unique identifiers are equal to each other, installing the updated program data to the plurality of electronic control units.

* * * * *